(12) United States Patent
de Campos et al.

(10) Patent No.: US 6,406,084 B1
(45) Date of Patent: Jun. 18, 2002

(54) SEAT ARRANGEMENT FOR VEHICLE

(75) Inventors: Armin Carneiro de Campos, Rudersberg; Rolf Mitschelen, Kirchheim/Teck, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/824,579

(22) Filed: Apr. 3, 2001

(30) Foreign Application Priority Data

Apr. 5, 2000 (DE) .......................................... 100 17 059

(51) Int. Cl.[7] .................................................. B60N 2/36
(52) U.S. Cl. ........................ 296/66; 296/69; 296/65.09; 296/65.16
(58) Field of Search ......................... 296/66, 65, 65.05, 296/65.09, 65.16; 297/335, 336

(56) References Cited

U.S. PATENT DOCUMENTS

| | | | |
|---|---|---|---|
| 2,916,325 A | * 12/1959 | Estes et al. ..................... | 296/66 |
| 2,926,948 A | * 3/1960 | Koplin et al. .................. | 296/66 |
| 4,273,376 A | * 6/1981 | Duguet et al. ............. | 296/65.09 |
| 4,932,709 A | 6/1990 | Wainwright ................ | 296/65.1 |
| 5,492,386 A | 2/1996 | Callum ........................ | 296/64 |

FOREIGN PATENT DOCUMENTS

| | | | |
|---|---|---|---|
| AU | 0106977 | * 3/1939 | .................. 296/66 |
| DE | 0928506 | * 6/1955 | .................. 296/66 |
| DE | 3826959 A1 | * 2/1989 | ............ B60N/1/00 |
| EP | 0013849 A2 | * 8/1980 | .................. 296/69 |

* cited by examiner

*Primary Examiner*—Stephen T. Gordon
*Assistant Examiner*—Patricia Engle
(74) *Attorney, Agent, or Firm*—Crowell & Moring, LLP

(57) ABSTRACT

A particular seat arrangement for vehicles having three rows of seats is provided. The rows are arranged one behind another, and each row is composed of at least two seats which are situated next to one another and which have seat cushions and a backrest. In order to enlarge the loading compartment, the seats of the two rear rows of seats can be folded. For this purpose, the backrests, which are coupled to the seat cushions, of the seats in the second row of seats can be folded onto the associated seat cushions and the seat cushions can be displaced forwards. In order to obtain a flat loading area, irrespective of the design of the rear side of the backrest of the seats in the second row of seats, the seats in the third row of seats have seat cushions which can be pivoted forwards through 180° about a front pivot axis and backrests which can be pivoted forward through 90° about a pivot axis fixed on the backrest lower edge. Flat boards are arranged on the lower sides of the seat cushions so that the boards can be placed onto the rear sides of the folded-down backrests of the second row of seats.

31 Claims, 3 Drawing Sheets

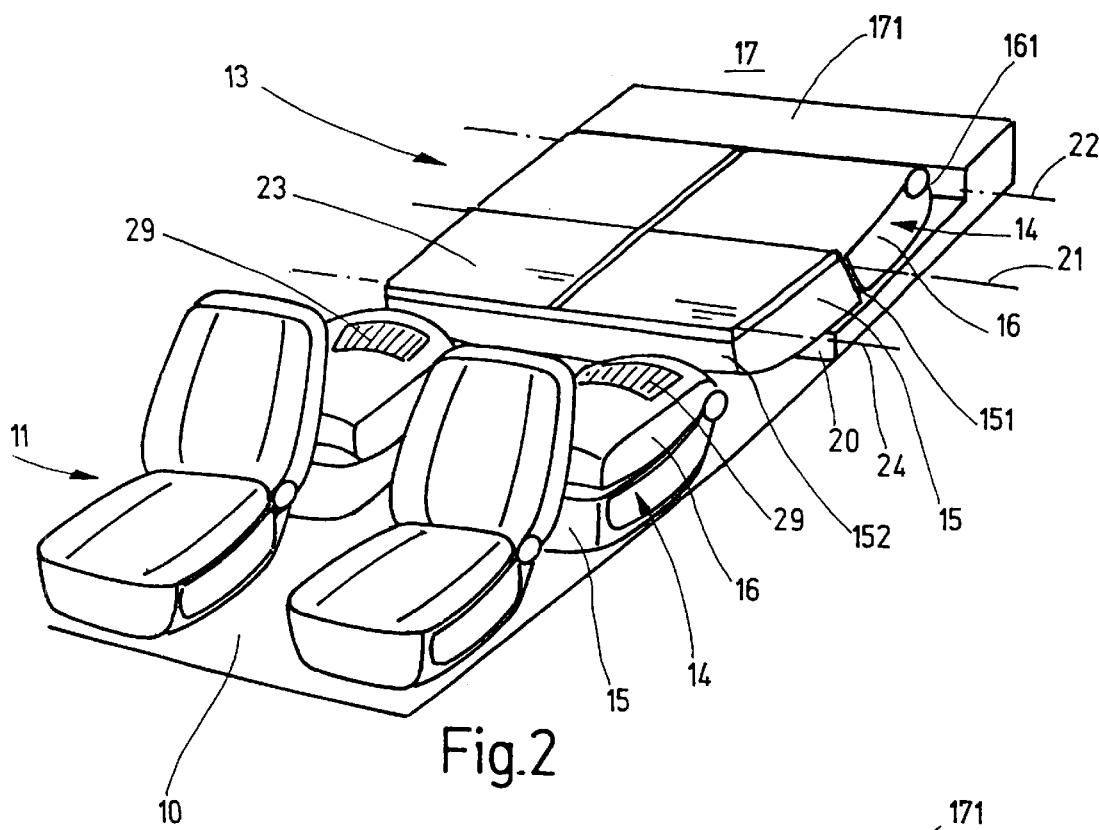
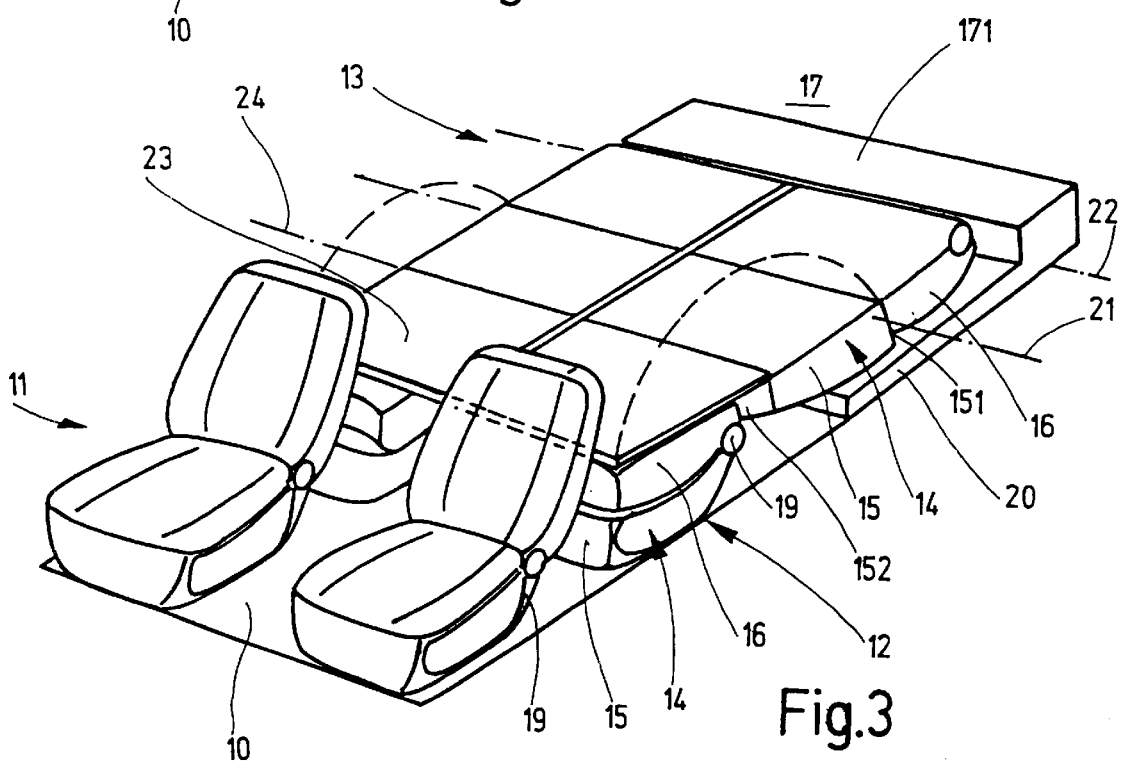

SEAT ARRANGEMENT FOR VEHICLE

This application claims the priority of German application 100 17 059.5, filed Apr. 5, 2000, the disclosure of which is expressly incorporated by reference herein.

BACKGROUND AND SUMMARY OF THE INVENTION

The present invention relates to a particular seat arrangement for vehicles including first, second, and third rows of seats which are arranged one behind another. Each of the rows is composed of at least two seats situated next to one another, and each of the seats includes a backrest and a seat cushion. The seats of the second and third rows, which define two rear rows of seats, are foldable in order to enlarge a loading compartment. The loading compartment can be enlarged by folding the backrests, which are coupled to the seat cushions of the seats in the second row of seats, onto the seat cushions of the seats in the second row of seats, shifting the seat cushions in the second row of seats forward in the longitudinal direction, and pivoting the seat cushions of the seats in the third row of seats through approximately 180° about a pivot axis. This pivot axis is fixed in the vehicle and runs transversely to the longitudinal direction of the vehicle in the vicinity of the front seat-cushion edge.

In a seat arrangement known from U.S. Pat. No. 5,492,386, the backrests of all of the seats of the second and third rows of seats are coupled to and can be folded onto the seat cushions. The seat cushions can be pivoted forward through 180° about a pivot axis running transversely to the longitudinal direction of the vehicle on the front seat-cushion edge. While the pivot axis of the seat cushions of the seats in the third row of seats is fixed in the vehicle, the pivot axis for the seat cushions of the seats in the second row of seats is fixed on a respective seat frame which can be displaced in the longitudinal direction of the vehicle. In order to fold away the seats for the purpose of enlarging the loading compartment, the seats in the second row of seats are slid forward, the backrests of the seats in the third row of seats are folded onto the associated seat cushions, and the seat packages, including seat cushions and backrests, are pivoted forward through 180° about the pivot axis fixed in the vehicle. The rear sides of the backrests come to lie on the foot area floor, which is situated at a lower level. If the loading compartment is to be further enlarged, then the seats of the second row of seats are slid back again. In this case, the seat frames slide past the seat packages; lying in the foot area, of the third row of seats. The backrests of the seats of the second row of seats are folded onto the seat cushions, and the resultant packages, including seat cushions and backrests, are pivoted forwards through 180° around the pivot axis which is fixed in the seat frame. The formation of a line of alignment, which extends from the rear loading compartment over the lower side of the seat cushions of the seats from the third row of seats and the second row of seats as far as the backrests of the seats in the first row of seats, now results.

In another seat arrangement known from U.S. Pat. No. 4,932,709, the backrests of all the seats of the second and third rows of seats are coupled to and can be folded onto the seat cushions. In addition, the seat cushions of the seats in the third row of seats can be pivoted forwards through 180° about a pivot axis which extends transversely to the longitudinal direction of the vehicle and is fixed in the vehicle. If the seats in the second and third rows of seats are folded down to enlarge the loading compartment, then the rear sides of the backrests of the seats in the second row of seats and the lower side of the seat cushions of the seats in the third row of seats form, together with the loading-compartment floor which is raised with respect to the foot area, a continuously flat loading area in the rear of the vehicle. In order to realize a loading area of this type, the rear sides of the backrests of the seats in the second row of seats have to have a flat design, leaving no scope for designing the rear sides of the backrests so as to improve the visual appearance for the passengers seated on the seats in the third row of seats.

The object of the present invention is to realize an enlarged loading compartment, in a seat arrangement of the type initially mentioned, with a flat loading area, by folding away the seats of the second and third rows of seats without subjecting the design of the rear sides of the backrests of the seats in the second row of seats to technical constraints required by the flat loading area. This object is achieved according to the invention by permitting the backrests of the seats in the third row of seats to be pivoted forward through at least 90° about a pivot axis which is fixed in the vehicle and runs transversely to the longitudinal direction of the vehicle in the vicinity of the backrest lower edge, and by carrying a flat board on the lower side of at least one of the seat cushions of the seats in the third row of seats. When the at least one of the seat cushions of the seats in the third row of seats is pivoted forwards, the flat board can be placed onto the rear side of the backrest of one of the seats in the second row of seats which has been shifted forward.

The seat arrangement according to the invention has the advantage that, after the seats in the second and third rows of seats have been folded away, flat boards are pulled out from the seat cushions of the seats from the third row of seats and are placed onto the rear sides, which lie on top, of the backrests of the seats from the second row of seats. The loading area, therefore, is always flat, irrespective of the design of the backrest. Also, gaps between the backrests can be closed, with the result that baggage is unable to fall into them. In addition, the rear sides of the backrests of the seats from the second row of seats, which rear sides are designed with aesthetic aspects in mind, are protected. These rear sides, therefore, cannot be damaged by baggage, which maintains a long term visually good appearance of the backrests for the passengers in the third row of seats.

Advantageous embodiments of the seat arrangement according to the invention, together with expedient developments and refinements of the invention, are also specified.

According to advantageous embodiments of the invention, boards arranged on lower sides of the seat cushions of the seats in the third row of seats are held such that they can pivot through 180° about a pivot axis which is fixed on the rear seat-cushion edge and runs transversely to the longitudinal direction of the vehicle. Alternatively, the boards are guided in a longitudinally displaceable manner on the lower side of the seat cushions and are designed such that they can be slid forwards over the rear seat-cushion edge onto the rear side of the backrest.

If the seat cushions of the seats in the third row of seats are combined to form a continuous seat bench, then, according to a preferred embodiment of the invention, the boards assigned to the seat cushions are combined to form a one-piece loading floor which covers the lower side of the seat bench. This loading floor is able to entirely cover the folded-over backrests of the seats in the second row of seats.

The invention is described in greater detail below with reference to exemplary embodiments illustrated in the drawings.

BRIEF DESCRIPTION OF THE DRAWINGS

FIG. 2 is an illustration which is similar to FIG. 1 but showing seats of the second and third rows of seats folded away so as to enlarge the loading compartment.

FIG. 3 is an illustration which is similar to FIG. 2 but showing boards placed on the backrests of the seats in the second row of seats in order to produce a flat loading-compartment floor.

DESCRIPTION OF THE PREFERRED EMBODIMENTS

Figure 1:
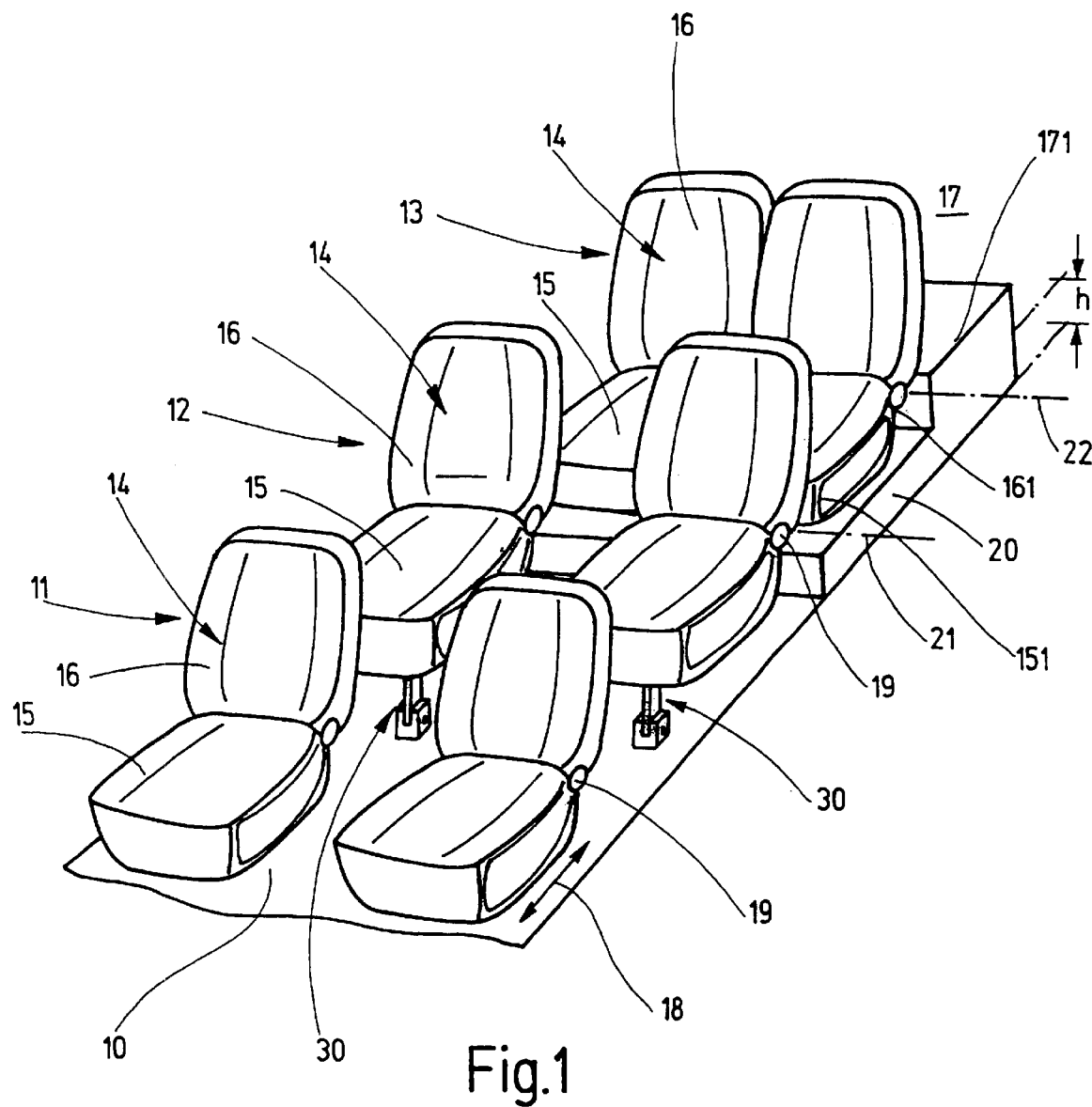
FIG. 1 shows a seat arrangement for a vehicle having three rows of seats in which each row has two individual seats arranged next to each other.

The seat arrangement for a vehicle, which is illustrated perspectively in FIG. 1, has three rows of seats 11, 12 and 13 arranged one behind another. Each row of seats consists of two individual seats 14 which are arranged next to each other. Each seat 14, in turn, has a seat cushion 15, together with a seat frame and seat padding accommodated therein, and a backrest 16.

Illustration of the head restraints, which are conventionally arranged on the backrests 16, has been omitted here for the sake of clarity. A loading compartment 17 is provided behind the third row of seats. The loading compartment shown is still minimal and has a loading-compartment floor 171 which is raised with respect to the foot area floor. The seats 14 in the first row of seats 11, which constitute the driver's seat and the front-passenger's seat, and optionally the seats 14 in the second row of seats 12, are fastened on the vehicle floor 10 such that they can be displaced in the longitudinal direction of the vehicle and locked to the vehicle floor in each displacement position. The longitudinal displaceability of the seats 14 in the first row of seats 11 is symbolized by double arrows 18. The backrests 16 of the seats 14 in the second row of seats 12 are coupled to the seat cushions 15 by hinge fittings 19, so that the backrests 16 can be folded with their front backrest surfaces onto the padded surfaces of the seat cushions 15. The rear sides of the backrests 16, referred to as backrest backs, of the seats 14 in the first and second rows of seats 11, 12 are designed with aesthetic aspects in mind. Here, these rear sides are slightly curved and are provided with insertion pockets 29. The rear sides of the backrests 16 in the third row of seats 13 are designed such that they are continuously planar and flat.

After the backrests 16 have been folded onto the seat cushions 15, the seats 14 in the second row of seats 12 can be simultaneously slid forwards, by way of a parallelogram-like kinematic arrangement 30 which is illustrated schematically in FIG. 1, and lowered onto the vehicle floor 10. The seat cushions 15 of the seats 14 in the third row of seats 13 are accommodated on a platform 20. The height h of the platform 20 with respect to the vehicle floor 10 is dimensioned in such a manner that the padded surface of the seat cushions 15 of the seats 14 in the third row of seats 13 is approximately aligned with the rear sides of the backrests 16 of the seats 14 in the second row of seats when these backrests 16 are folded onto the seat cushions 15 of the seats 14 in the second row of seats 12 and the seat packages are lowered as described (FIGS. 2 and 3). The seat cushions 15 of the seats 14 in the 2nd row of seats 13 can be pivoted forward through approximately 180° about a pivot axis 22 when arranged on the front seat-cushion edge 151, and the backrests 16 of the seats 14 in the third row of seats 13 can be pivoted forward through at least 90° about a pivot axis 22 arranged in the vicinity of the lower backrest edge 161. Both pivot axes 21, 22 run transversely to the longitudinal direction of the vehicle and are fixed in the vehicle. The loading-compartment floor 171 is raised with respect to the platform 20 by the depth of the backrest 16 so that, after the backrest 16 has been folded down, its rear side is aligned with the loading-compartment floor 171. However, the loading compartment 17 may also be designed in such a manner that the loading-compartment floor 171 is aligned with the surface of the platform 20.

As FIG. 2 shows, a planar board 23 is arranged on the lower side of each of the seat cushions 15 of the seats 14 in the third row of seats. In the embodiment of FIGS. 2 and 3, the planar board 23 is held such that it can pivot through at least 180° about a pivot axis 24 which is fixed on the seat cushion 15, on the rear seat-cushion edge 152, and runs transversely to the longitudinal direction of the vehicle. This board 23 is latched to the lower side of the seat cushions 15 in such a manner that it is unable to pivot out in the in-use position of the seats 14. The latching device is not illustrated in FIG. 2.

If, for the purpose of enlarging the loading compartment, the seats 14 of the second and third rows of seats 12 and 13 are now folded away, then, first of all, the backrests 16 of the seats 14 in the second row of seats 12 are folded onto the associated seat cushions 15. The seat packages, which are formed by the seat cushions 15 and folded-over backrests 16, are pivoted forwards by way of the parallelogram-like kinematic arrangement 30 and, at the same time, downwards to the vehicle floor 10. As a result, a clearance for pivoting in the seat cushions 15 of the seats 14 in the third row of seats 13 is created between the seats 14 of the second row of seats 12 and the platform 20. The seat cushions 15 of the seats 14 in the third row of seats 13 are now pivoted forwards through approximately 180°, about their pivot axis 21, and the backrests 16 are pivoted forwards through approximately 90°, about their pivot axis 22, into the space released by the seat cushions 15 and in front of the platform 20 (FIG. 2). The boards 23, which are held on the lower side of the seat cushions 15, now lie on top and are folded over forwards about their pivot axis 24 onto the rear side of the backrests 16 of the seats 14 of the second row of seats 12, as is sketched in FIG. 3. Thus, irrespective of the curved design of the rear side of the backrests 16 of the seats 14 in the second row of seats 12, a flat loading area is realized. This flat loading area reaches from the loading-compartment floor 171 as far as the backrests 16 of the seats 14 in the first row of seats 11, and also closes the relatively large space between the two backrests 16 of the folded-down seats 14 of the second row of seats 12.

Figure 5:
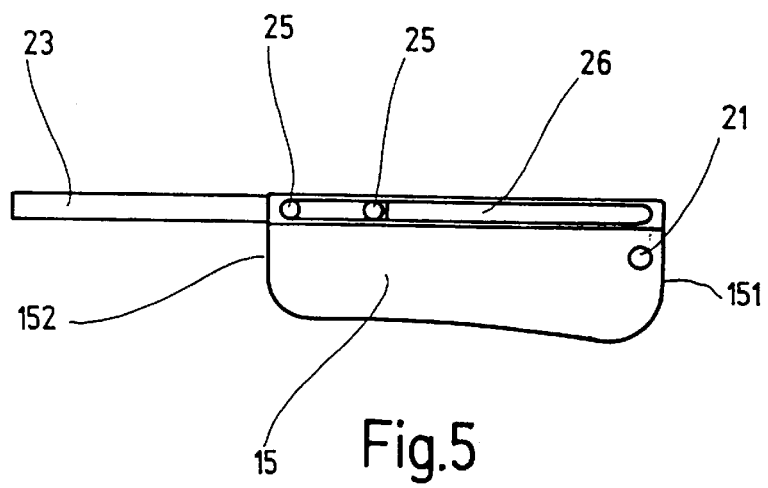

FIG. 5 is a schematic illustration of a seat cushion 15 of a seat 14 in the third row of seats 13 in an embodiment in which the board 23 is not held on the lower side of the seat cushion 15 in a manner such that it can pivot. Instead, the board is held such that it can be displaced over the rear seat-cushion edge 152. For this purpose, the board 23 is guided in an axially displaceable manner, by way of laterally protruding guide pins 25, in two guide rails 26 lying opposite each other on the seat cushion 15. If the seats 14 are folded over in the above-described manner, the board 23 is slid over the rear side of the backrests 16 of the front seat 14 in the second row of seats 12.

Figure 4:
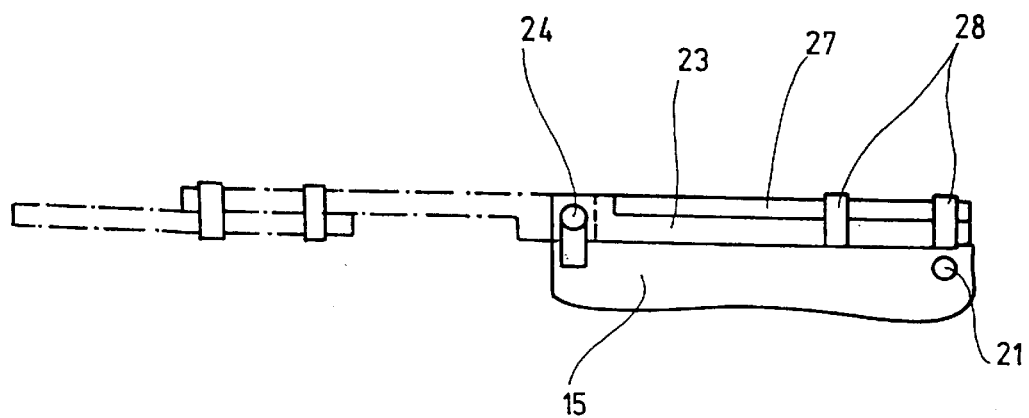
FIGS. 4 and 5 show side views of folded-over seat cushions of seats in second seat rows in accordance with second and third embodiments.

FIG. 4 schematically shows a seat cushion 15 of a seat 14 in the third row of seats 13 according to an embodiment in which the board 23 is again held on the lower side of the seat cushion 15 in a manner such that it can pivot. The pivot axis of the board 23 is arranged in the vicinity of the rear seat-cushion edge 152 and is again indicated by reference number 24. The position of the board 23, in which the board is pivoted forwards through 180°, is shown by dash-dotted lines in FIG. 4. A pull-out board 27 is also held displaceably on the board 23, is accommodated within the contour of the board 23, and can be pulled out telescopically relative to the board 23 in the longitudinal direction of the vehicle. Guide elements, which hold the pull-out board 27 displaceably on the board 23, are indicated by 28. The pull-out board 27, which can be pulled out telescopically, can be used to cover relatively large loading-area regions irrespective of the surface available for accommodating the board 23 on the lower side of the seat cushion 15. This is the case even if the seat-cushion surface 15 is smaller than the surface of the rear side of the backrest 16 of the front seat 14 in the second row of seats 12.

The pull-out board 27 can also be arranged on the board 23 in such a manner that it can be pulled out transversely to the longitudinal direction of the vehicle. This is advantageous whenever the surface of the seat cushion 15 for accommodating the board 23 and the pull-out board 27 is not as wide as the backrest 16 of the front seat 14 in the second row of seats 12. The pull-out board 27, which is slid out transversely after the board 23 has been shifted in the folded-over state of the seats 14, then, together with the board 23, entirely covers the rear side of the folded-over backrest 16 in the second row of seats 12.

In certain applications, the seat cushions 15 of the seats 14 in the third row of seats 13 are combined to form a uniform seat bench. In this case, the boards 23 assigned to the seat cushions 15 are combined to form a one-piece loading floor which covers the lower side of the seat bench. A loading floor of this type is then folded, in turn, onto the rear side of the folded-over backrests 16 in the second row of seats 12 or is slid over these backrests 16. An additional, uniform pull-out board 27 can likewise be provided on the one-piece loading floor.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A seat arrangement for a vehicle comprising first, second, and third rows of seats which are arranged one behind another, each of said rows being composed of at least two seats situated next to one another, each of said seats including a backrest and a seat cushion, the seats of the second and third rows, which define two rear rows of seats, being foldable in order to enlarge a loading compartment,
wherein said loading compartment can be enlarged by folding the backrests which are coupled to the seat cushions of the seats in the second row of seats onto the seat cushions of the seats in the second row of seats, shifting the seat cushions in the second row of seats forward in the longitudinal direction, and pivoting the seat cushions of the seats in the third row of seats through approximately 180° about a pivot axis which is fixed in the vehicle and runs transversely to the longitudinal direction of the vehicle in the vicinity of a front seat-cushion edge,
wherein the backrests of the seats in the third row of seats can be pivoted forwards through at least 90° about a pivot axis which runs transversely to the longitudinal direction of the vehicle in the vicinity of a backrest lower edge and is fixed in the vehicle, and
wherein a flat board is arranged on the lower side of at least one of the seat cushions of the seats in the third row of seats so that, when the at least one of the seat cushions of the seats in the third row of seats is pivoted forwards, the flat board can be placed onto the rear side of the backrest of one of the seats in the second row of seats which has been shifted forward.

2. The seat arrangement according to claim 1, wherein the seats in the second row of seats can be lowered in such a manner that, after the backrests have been folded onto the seat cushions, the rear sides of the backrests lie level with the lower sides of the seat cushions, which have been folded forwards, of the seats in the third row of seats.

3. The seat arrangement according to claim 2, wherein the seats of the third row of seats are placed such that they are raised with respect to the seats in the second row of seats which have been lowered such that the seat-cushion surfaces of the seats in the third row of seats are approximately aligned with the surfaces of the backs of the backrests, which have been folded down onto the associated seat cushions, of the seats in the second row of seats.

4. The seat arrangement according to claim 1, wherein the flat board is held such that it can pivot through 180° about a pivot axis which is fixed on the rear seat-cushion edge and runs transversely to the longitudinal direction of the vehicle.

5. The seat arrangement according to claim 1, wherein the flat board is guided in a longitudinally displaceable manner on the lower side of the seat cushion and can be slid forwards over a rear seat-cushion edge.

6. The seat arrangement according to claim 1, and further comprising a pull-out board which is held displaceably on the flat board, which is accommodated within the contour of the flat board, and which can be slid out telescopically relative to the flat board.

7. The seat arrangement according to claim 1, wherein the seat cushions of the seats in the third row of seats are combined to form a seat bench, and wherein the flat board arranged on the lower side of the at least one of the seat cushions forms a one-piece loading floor covering the lower side of the seat bench.

8. The seat arrangement according to claim 2, and further comprising a parallelogram-like kinematic arrangement by which the second row of seats can be lowered.

9. The seat arrangement according to claim 6, wherein the pull-out board can be slid out telescopically transversely to the longitudinal direction of the vehicle.

10. The seat arrangement according to claim 6, wherein the pull-out board can be slid out telescopically in the longitudinal direction of the vehicle.

11. The seat arrangement according to claim 2, wherein the flat board is held such that it can pivot through 180° about a pivot axis which is fixed on the rear seat-cushion edge and runs transversely to the longitudinal direction of the vehicle.

12. The seat arrangement according to claim 3, wherein the flat board is held such that it can pivot through 180° about a pivot axis which is fixed on the rear seat-cushion edge and runs transversely to the longitudinal direction of the vehicle.

13. The seat arrangement according to claim 2, wherein the flat board is guided in a longitudinally displaceable manner on the lower side of the seat cushion and can be slid forwards over a rear seat-cushion edge.

14. The seat arrangement according to claim 3, wherein the flat board is guided in a longitudinally displaceable manner on the lower side of the seat cushion and can be slid forwards over a rear seat-cushion edge.

15. The seat arrangement according to claim 2, and further comprising a pull-out board which is held displaceably on the flat board, which is accommodated within the contour of the flat board, and which can be slid out telescopically relative to the flat board.

16. The seat arrangement according to claim 15, wherein the pull-out board can be slid out telescopically transversely to the longitudinal direction of the vehicle.

17. The seat arrangement according to claim 15, wherein the pull-out board can be slid out telescopically in the longitudinal direction of the vehicle.

18. The seat arrangement according to claim 3, and further comprising a pull-out board which is held displaceably on the flat board, which is accommodated within the contour of the flat board, and which can be slid out telescopically relative to the flat board.

19. The seat arrangement according to claim 18, wherein the pull-out board can be slid out telescopically transversely to the longitudinal direction of the vehicle.

20. The seat arrangement according to claim 18, wherein the pull-out board can be slid out telescopically in the longitudinal direction of the vehicle.

21. The seat arrangement according to claim 4, and further comprising a pull-out board which is held displaceably on the flat board, which is accommodated within the contour of the flat board, and which can be slid out telescopically relative to the flat board.

22. The seat arrangement according to claim 21, wherein the pull-out board can be slid out telescopically transversely to the longitudinal direction of the vehicle.

23. The seat arrangement according to claim 21, wherein the pull-out board can be slid out telescopically in the longitudinal direction of the vehicle.

24. The seat arrangement according to claim 5, and further comprising a pull-out board which is held displaceably on the flat board, which is accommodated within the contour of the flat board, and which can be slid out telescopically relative to the flat board.

25. The seat arrangement according to claim 24, wherein the pull-out board can be slid out telescopically transversely to the longitudinal direction of the vehicle.

26. The seat arrangement according to claim 24, wherein the pull-out board can be slid out telescopically in the longitudinal direction of the vehicle.

27. The seat arrangement according to claim 2, wherein the seat cushions of the seats in the third row of seats are combined to form a seat bench, and wherein the flat board arranged on the lower side of the at least one of the seat cushions forms a one-piece loading floor covering the lower side of the seat bench.

28. The seat arrangement according to claim 3, wherein the seat cushions of the seats in the third row of seats are combined to form a seat bench, and wherein the flat board arranged on the lower side of the at least one of the seat cushions forms a one-piece loading floor covering the lower side of the seat bench.

29. The seat arrangement according to claim 4, wherein the seat cushions of the seats in the third row of seats are combined to form a seat bench, and wherein the flat board arranged on the lower side of the at least one of the seat cushions forms a one-piece loading floor covering the lower side of the seat bench.

30. The seat arrangement according to claim 5, wherein the seat cushions of the seats in the third row of seats are combined to form a seat bench, and wherein the flat board arranged on the lower side of the at least one of the seat cushions forms a one-piece loading floor covering the lower side of the seat bench.

31. The seat arrangement according to claim 6, wherein the seat cushions of the seats in the third row of seats are combined to form a seat bench, and wherein the flat board arranged on the lower side of the at least one of the seat cushions forms a one-piece loading floor covering the lower side of the seat bench.

* * * * *